July 24, 1928.　　　　　　　　　　　　　　　　　1,678,493
L. E. W. VAN ALBADA
FINDER FOR PHOTOGRAPHIC CAMERAS
Filed Aug. 24, 1923
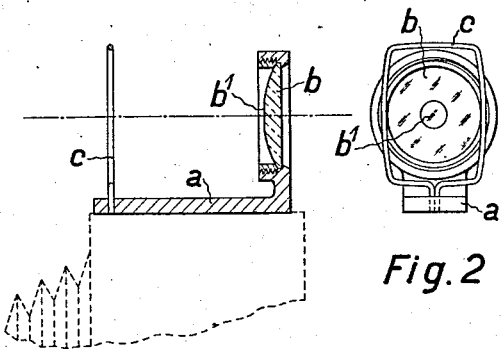
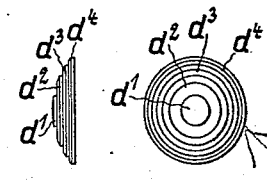
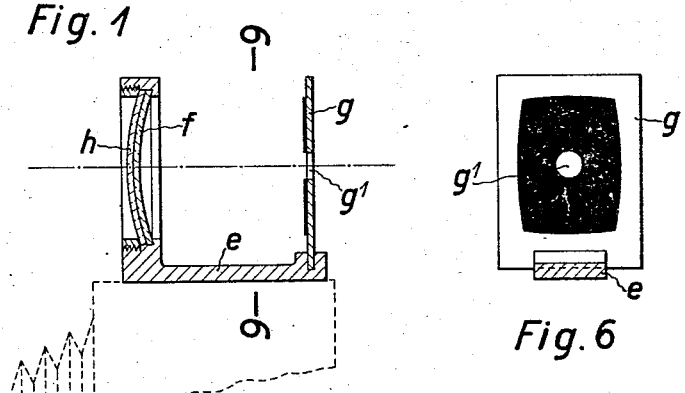
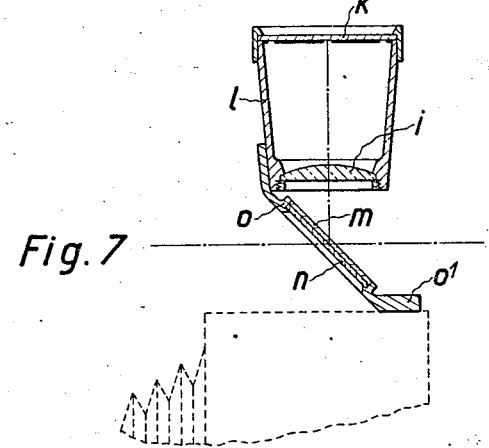
Inventor:
Lieuwe Evert Willem van Albada Patented July 24, 1928.

1,678,493

UNITED STATES PATENT OFFICE.

LIEUWE EVERT WILLEM VAN ALBADA, OF AMSTERDAM, NETHERLANDS, ASSIGNOR TO THE FIRM CARL ZEISS, OF JENA, GERMANY.

FINDER FOR PHOTOGRAPHIC CAMERAS.

Application filed August 24, 1923, Serial No. 659,170, and in Germany September 6, 1922.

The present invention relates to a finder for photographic cameras which, in principle, corresponds to the collimator well-known as a sighting means for fire-arms. Besides, by using, as has been suggested for finders, as a collective member of the collimator a semi-lens, such a finder admits in the direction, perpendicular to the surface of intersection of the semi-lens, of only estimating the size of the image because in the one half of the field of view one only sees the marks and in the other half only the object to be taken. This drawback can be removed by using as a collective member such a member which has the refractive power zero at least over a zone approximately concentric with its axis. In that case the collimator disc is supposed to be so constructed as to substantially admit of the free view upon the respective object. When using such a finder it must be brought at such a distance from the eye that the rays emerging directly from the object to be taken enter the eye through that part or those parts having the refractive power zero, whilst through the remaining part of the collective member the lines or the marks of the collimator are simultaneously visible.

A suitable collective member is, for instance, obtained by piercing an ordinary lens in the centre in the axial direction or by grinding on both its sides a small, plane surface perpendicular to the lens axis.

Another suitable collective member is attained by using a lens which has no continuous spherical surfaces but in which the spherical surfaces are interrupted by zones having the refractive power zero, such as plane parallel zones. It is possible to make such a step-like lens for instance in such a way that a number of thin, round, plane-parallel glass plates, whose diameters are graduated according to the lens-curvature to be made, are cemented centrically with each other and, on grinding the spherical surfaces, the margins of the single lamellæ are only ground off to such an extent that between two consecutive lamellæ a plane-parallel ring each is allowed to remain. In a collimator lens of this kind the observing eye then also sees through the plane-parallel parts of the lens the object to be taken and simultaneously through the collective parts of the lens the lines or the marks of the collimator.

Another constructional form is attained by bringing about the collective optical effect by means of a concave mirror. In that case the latter mirror must naturally, on the one hand, not prevent the rays coming from the object to be taken from entering the eye, it must therefore in addition to its capacity as a concave mirror be transparent and have the refractive power zero for the traversing rays, and on the other hand the collimator disc, which with this arrangement gets in front of the eye, must have in its centre a corresponding sight-opening for the passage of the rays. A transparent concave mirror may be embodied in different ways. An obvious constructional form consists in providing a correspondingly meniscal glass plate, having the refractive power zero for the traversing rays, on one side with a semi-transparent mirror-coating, so that the concave mirror is simultaneously transparent and reflecting over its whole surface. It may also suffice to use as a concave mirror an uncoated, meniscal glass plate. With a view to adapting in this case the luminosity of the object to be taken and viewed through the glass plate to the considerably less bright image of the collimator, the meniscal glass plate is suitably made of smoked or some other coloured glass. It is also possible to replace the physical ray division, which is effected in the aforesaid manner, by a geometrical ray division by silvering a meniscal glass plate, e. g. in stripes or gratings in such a way that transparent and reflecting elements interchange with each other over the entire reflecting surface.

Another suitable constructional form is attained by disposing the collimator with its axis approximately perpendicular to the objective axis of the photographic camera and by locating in front of this collimator a plane-parallel glass plate inclined to the objective axis at about 45°, which glass plate on the one hand reflects the rays emerging from the collimator into the eye of the observer and which on the other hand simultaneously admits of looking towards the object to be taken. By carrying out with this arrangement the marks as gaps of the otherwise opaque collimator disc, the same can be illuminated from above in a very favourable way. Also in this case it will be advisable, in order to compensate the difference in luminosity between the object viewed through the plane-parallel plate and the image of the collimator, to provide the plane-parallel plate with a suitable mirror-coating.

In the annexed drawing are represented a number of different constructional examples of finders whereby the photographic camera, with which the finder is assumed to be rigidly connected, is only diagrammatically shown by the upper part of the outline. Fig. 1 shows in a longitudinal section a finder with planely ground lens, Fig. 2 shows a side elevation of the same finder; Fig. 3 shows in a side elevation another lens form for the same finder; Fig. 4 shows the same lens in a front view; Fig. 5 illustrates a finder with a concave mirror in a longitudinal section; Fig. 6 is a cross section on the line 6—6 of Fig. 5; Fig. 7 is a vertical section of a finder with a collimator disposed perpendicularly to the objective axis and a plane-parallel plate fitted in front of the same.

With the first constructional example shown in Figs. 1 and 2 a base plate $a$ fixed on the camera carries on the one hand a collimator lens $b$ and on the other hand a wire frame $c$ embodying the collimator disc, which represents a continuous series of marks and delimits the image field, the lateral edges of which frame being curved in the opposite direction in order to compensate the distortion caused by the lens $b$. The latter has on its convex side in the centre a small plane surface $b^1$, thus acting in the range of this surface $b^1$ as a plane-parallel plate. Hence the observer views through this plane-parallel part of the lens $b$ the object to be taken in full size, whilst at the same time the frame $c$ can be clearly seen through the remaining part of the lens $b$. Instead of this lens it is possible to also use for the finder the step-like lens represented in Figs. 3 and 4. The latter lens is composed of four thin, cemented, round glass discs $d^1$, $d^2$, $d^3$ and $d^4$ of suitably graduated diameters and the margins of these discs are ground off according to a spherical surface to such an extent that between the single spherical zones plane-parallel parts are still left. With this lens it is thus possible to view again through the plane-parallel elements the object to be taken in full size, whilst for the rest the lens renders the collimator frame visible.

In the finder shown in Figs. 5 and 6 a base plate $e$ carries a concave mirror $f$ and opposite the same a collimator disc $g$ having a sight-opening $g^1$ in the axis of the concave mirror $f$. The latter consists of a curved glass plate, whose convex side is semi-transparently silvered, so that in spite of the action of the mirror from the sight-opening the object to be taken is still clearly visible through the concave mirror. For the protection of the silver coating there is disposed directly in front of the plate $f$ a second, meniscal glass plate $h$. On the collimator disc $g$ made of sheet metal the surface corresponding to the image field is painted black, whilst all around projects a white margin. An observer looking through the sight-opening $g^1$ sees therefore through the concave mirror $f$ the object to be taken in such a way, that the image field is delimited all around by a light margin. One then already gets in the finder approximately the same impression as produced with the usual execution by the finished photograph and will thus be able to judge quite well the final effect of the image before the exposure.

The finder illustrated in Fig. 7 has a collimator of the usual form, i. e. a plano-convex lens $i$ and a collimator disc $k$ which are rigidly connected by a casing $l$, the axis of which collimator is disposed perpendicularly to the objective axis. The collimator disc $k$ is a glass plate, on which the marks are formed by gaps of an opaque coating, so that the same always appear to be well illuminated by the light diffusely entering from outside. In front of the lens $i$ is disposed a plane-parallel glass plate $m$, inclined to the objective axis at 45° and carrying on its lower side a grate-like mirror coating, whereby it reflects the mark image into the eye of the observer, whilst simultaneously the object to be taken is visible through the plate $m$. In order to protect the mirror coating a second plane-parallel plate $n$ is cemented to the plate $m$. A mount $o$ of the two glass plates $m$ and $n$, carrying simultaneously the collimator casing $l$, admits of fixing the finder on the camera with the aid of an extension $o^1$.

I claim:

1. In a finder for photographic cameras a collective member having the refractive power zero at least over a zone surrounding its axis, and a plurality of marks lying in the focal plane of the said collective member.

2. In a finder for photographic cameras a lens consisting of concentric collective zones and concentric zones having the refractive power zero interposed between the same, and a plurality of marks lying in the focal plane of the said lens.

3. In a finder according to claim 2, the zones, having the refractive power zero, being plane-parallel zones.

4. In a finder for photographic cameras a collective member, a plurality of marks lying in the focal plane of this member, and means allowing of simultaneously observing on the one hand the marks through the said member and on the other hand direct the object to be photographed.

LIEUWE EVERT WILLEM VAN ALBADA.